No. 895,479. PATENTED AUG. 11, 1908.
R. LOVE.
FERTILIZER DISTRIBUTER.
APPLICATION FILED MAR. 17, 1904.
2 SHEETS—SHEET 1.
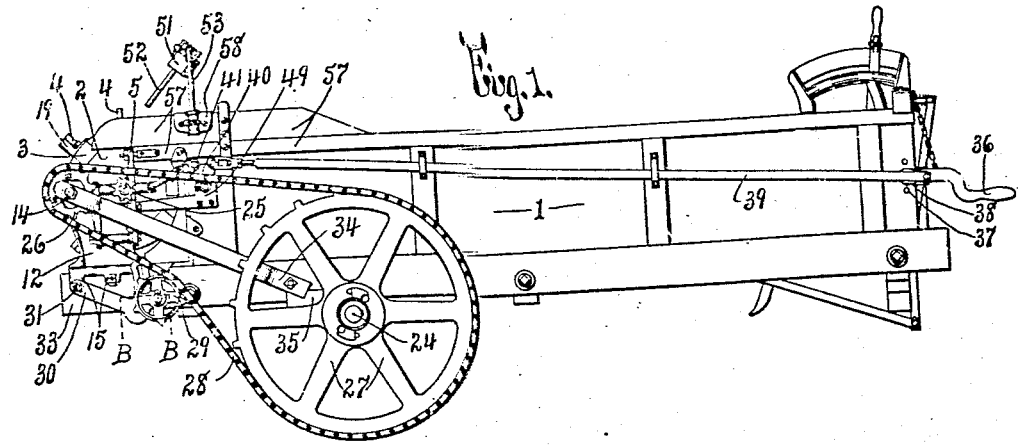
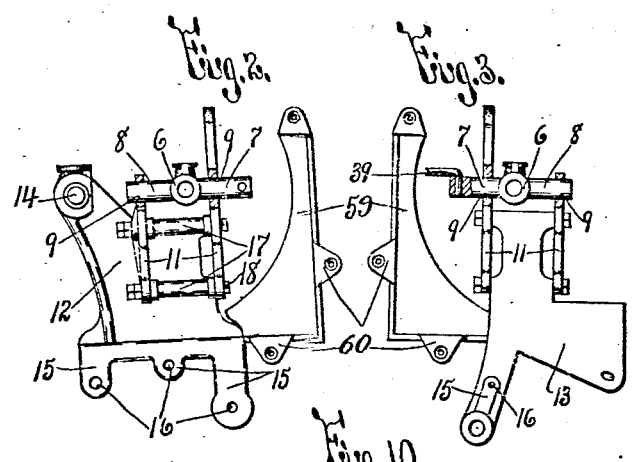
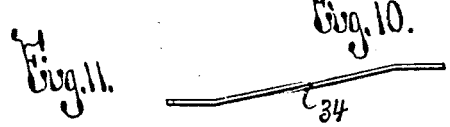
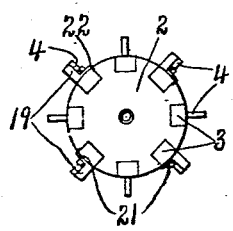
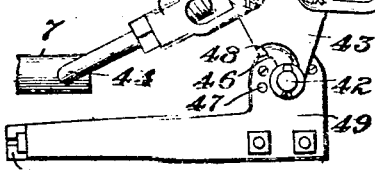
WITNESSES:
Chas. J. Foner.
Chas. H. Young.
INVENTOR
Robert Love
BY
Hey & Parsons
ATTORNEYS

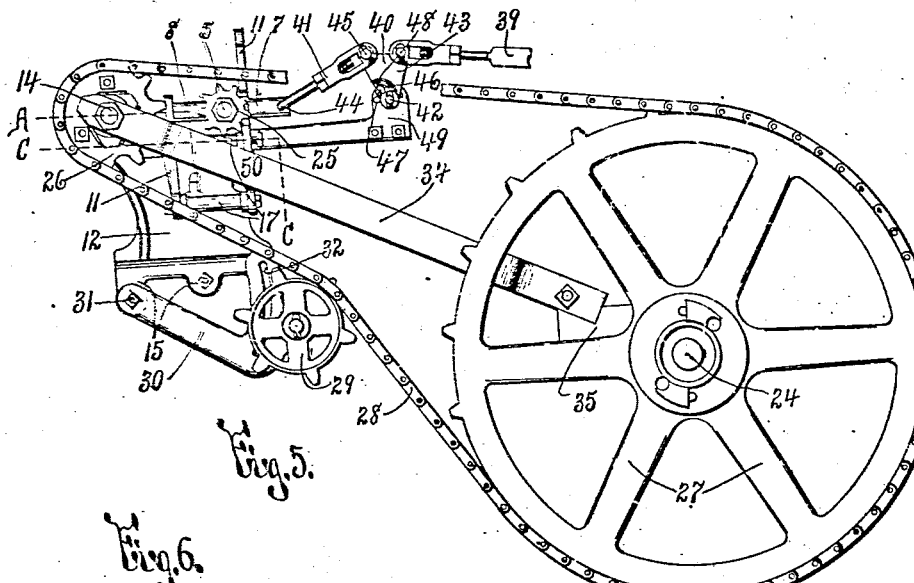
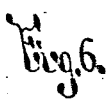
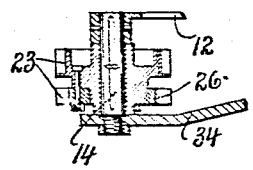
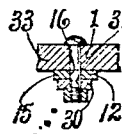
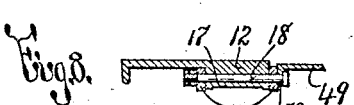
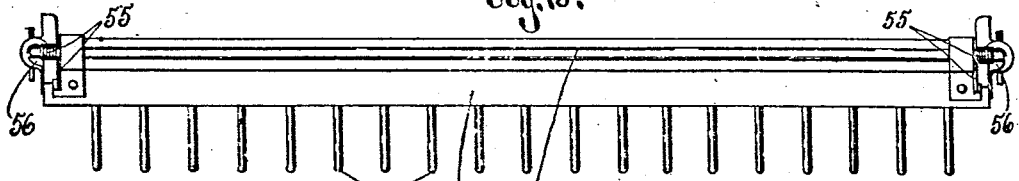
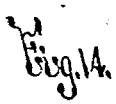
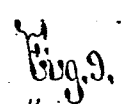
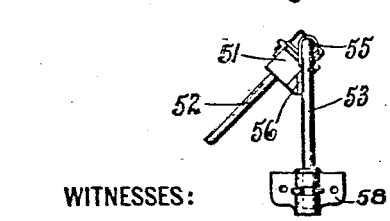
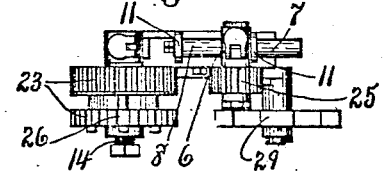

UNITED STATES PATENT OFFICE.

ROBERT LOVE, OF SYRACUSE, NEW YORK, ASSIGNOR TO KEMP & BURPEE MANUFACTURING COMPANY, OF SYRACUSE, NEW YORK, A CORPORATION OF NEW YORK.

FERTILIZER-DISTRIBUTER.

No. 895,479.   Specification of Letters Patent.   Patented Aug. 11, 1908.

Application filed March 17, 1904. Serial No. 198,552.

*To all whom it may concern:*

Be it known that I, ROBERT LOVE, of Syracuse, in the county of Onondaga and State of New York, have invented a certain new and useful Fertilizer-Distributer, of which the following is a specification.

My invention relates to fertilizer-distributers, and has for its object the production of a particularly simple and highly efficient means for controlling the operation of the discharging device, and means for supporting said device and coacting mechanism.

In describing this invention, reference is had to the accompanying drawing, in which like characters refer to corresponding parts in all the views.

Figure 1 is a side elevation of my distributer the supporting wheels being removed. Figs. 2 and 3 are enlarged side elevations, partly in section, of supporting brackets at opposite ends of the discharging device and the bearings for said device reciprocally movable in the brackets. Fig. 4 is an enlarged detail view of parts seen in Fig. 1. Fig. 5 is an enlarged view in side elevation of the driving mechanism for the discharging device, the locking means for said device, and portions of the supporting means for these parts. Fig. 6 is a detail sectional view on line A--A, Fig. 4. Fig. 7 is a sectional view on line B--B, Fig. 1, parts being omitted. Fig. 8 is a sectional view on line C--C, Fig. 5, parts being omitted. Fig. 9 is a detail plan view of a portion of the means for supporting and driving the discharging device. Fig. 10 is an edge view of the brace connecting the support for the driving axle and the spindle carrying the driving member for the discharging device. Fig. 11 is an end view of the discharging device. Fig. 12 is an enlarged top plan view of one of the deflecting teeth provided on the discharging device, the contiguous portion of the frame of said device being shown. Figs. 13 and 14 are, respectively, top plan and end views of the comb.

This fertilizer-distributer comprises, generally, a receptacle 1 for the fertilizer, a discharging device 2, means for actuating the discharging device, means for controlling the operation thereof, and means for supporting said device and coacting mechanism.

The receptacle 1 is of any desirable form, size and construction, is mounted on suitable supporting wheels, not illustrated, and is provided with an open rear end, and the usual bottom, not shown, movable rearwardly for feeding the fertilizer to the discharging device. This device 2 is of any suitable form, size and construction, is movable for discharging the fertilizer, and is also shiftable from and toward the body of fertilizer, and into and out of connection with the means for effecting the operation of said device. As illustrated, the device 2 preferably consists of a rotatable beater extending crosswise of the receptacle 1 at the rear end thereof, and comprising a frame cylindrical in form and usually composed of separated lengthwise bars 3 having teeth 4 projecting therefrom. Said beater when not in use to discharge the fertilizer, serves as the end-board of the receptacle 1, and when about to commence its discharging operation, is moved substantially lengthwise of the receptacle for a limited distance from the rear end of the fertilizer therein, thus freeing the teeth 4 from the fertilizer and preventing undue straining and breakage of the parts when the beater is started. Opposite ends of the beater are provided with trunnions 5 journaled in bearings 6 having forwardly and rearwardly projecting arms 7 8 reciprocally-movable substantially lengthwise of the receptacle in guide-openings 9 formed in supporting arms 11 which are arranged at opposite sides of the distributer (arms 11 at each side being disposed one in advance of the other), and are preferably detachably secured to upright brackets 12 13 also arranged at opposite sides of the distributer, one of said brackets, as 12, being provided with a spindle or stud 14 fixed thereto at the rear of the bearing 6 for one of the trunnions 5. Said brackets 12 13 are formed with depending ears 15 engaged with side surfaces of the sills of the receptacle 1 and having bolt-openings 16 therein, and with laterally-projecting bosses 17 having openings extending therethrough lengthwise of the receptacle 1 for receiving bolts 18, which secure the arms 11 to the brackets, said arms finding bearings at opposite ends of the bosses 17.

The ends of the periphery of the beater, or discharging device 2, are provided with teeth 19, Fig. 11, which deflect the fertilizer from the ends of the beater toward the center thereof, and thereby prevent the accumulation of fertilizing material between the end surfaces of said beater and the opposing inner surfaces of the receptacle and the supporting means for the beater, as the brackets 12 13. Said teeth 19 are each formed with an inner surface 20 inclined from its advance edge rearwardly relatively to the direction of movement of the beater, toward the center of the beater, and with a base 21 engaged with the outer surface of a bar 3 forming part of the beater-frame and with an extension 22 of said base engaged with a side edge of said bar.

The means for actuating the discharging device, comprises a constantly-movable driving member 23, power-transmitting means connecting said member to the driving or main axle 24 of the fertilizer-distributer, and a driven member 25 which is carried by the discharging device and partakes of the movements thereof, thus shifting said driven member 25 into and out of engagement with the driving member 23 as the discharging device is moved from and toward the body of fertilizer. Said driving member 23 is journaled on the spindle 14 fixed to the bracket 12 and preferably consists of a gear-wheel having a hub of angular cross-section, and a sprocket-wheel 26 detachably secured, Fig. 6, by suitable bolts to the gear-wheel and having an axial opening of corresponding form to receive said hub.

The power-transmitting means connecting the driving member 23 to the axle 24 comprises a sprocket-wheel 27 fixed to said axle, a chain 28 running over the sprocket-wheels 26 27, and an idler 29 for taking up the slack in the chain. Said idler 29 is mounted on a spindle provided on an adjustable part 30 having one end provided with a pivot-opening 31 alined with one of the openings 16 of the bracket 12, and its other er , formed with a slot 32 concentric with the opening 31 and alined with another of said openings 16. Suitable bolts are passed respectively through these two openings 16 and the pivot-opening 31 and slot 32, and thus secure the bracket 12 to the sill 33 engaged thereby, permit adjustment of the part 30 about the bolt in the opening 31, and hold said part 30 in its adjusted position.
A brace 34, Fig. 10, is arranged between the outer end of the spindle or stud 14 and the support or hanger 35 for the axle 24, the rear end of the brace being deflected outwardly, and the front end thereof being arranged in a substantially V-shaped socket in said support or hanger. It will be noted that the means for actuating the discharging device is supported wholly by the bracket 12 and the axle 24, and that the brace 34 holds apart the driving member 23 and the sprocket-wheel 27, thus preserving the parallelism of their axes and preventing undue strain and friction incidental to actuation of the driving member.

The driven member 25 usually consists of a gear-wheel which is fixed to one of the trunnions 5 and is movable into and out of mesh with the gear-wheel 23, as the discharging device 2 is moved from and toward the body of fertilizer.

The means for controlling the operation of the discharging device 2 is, generally, means for moving said device from and toward the body of fertilizer substantially lengthwise of the receptacle 1, and thus connecting the driven member 25 to the driving member 23, or disconnecting said members and, as here illustrated, said means comprises an actuating member or lever 36 arranged at the front of the distributer, a rock-shaft 37 fixed to the lower end of the lever and forming essentially a part thereof, said rock-shaft being disposed crosswise of the front end of the receptacle 1 and having its ends provided with cranks 38, and links 39 adjustable in length and arranged at opposite sides of the receptacle and having their front ends pivoted respectively to the cranks 38 and their rear ends connected to the forwardly-extending arms 7 of the bearings 6. One of these links 39 is connected directly to the arm 7 of the corresponding bearing 6, and the other link is connected to locking means for holding the device 2 in its rearward position.

As best seen in Fig. 4, the locking means connected to one of the links 39 consists of two members 40 41, one, a lever 40 having its lower end pivoted at 42 to a side of the receptacle 1, and its upper end provided with an offset portion 43 pivoted eccentric to the pivot 42 to the rear end of the corresponding link 39; and the other, a link 41 adjustable in length, and having its rear end pivoted at 44 to the forwardly-projecting arm 7 of the corresponding bearing 6, and its front end pivoted at 45 to the upper or free end of the lever 40 eccentric to the pivot 42, said members 40 41 forming practically a toggle. As the discharging device 2 is forced backwardly from the load of fertilizer, the pivot or toggle-joint 45 moves downwardly in an arc intersecting a straight line passing through the pivots 42 and 44, but immediately after the pivot 45 passes below said line, a face 46 on the member 40 encounters the upper surface of a fixed abutment or projection 47, whereupon, as will be obvious to those skilled in the art, the members 40 41 are so arranged that they hold the device 2 in its discharging position and positively prevent forward movement thereof. In the preferable construction of my invention, a shoulder on the member 40 is movable between the pivot 42 and the curved path of movement of the pivot 45, the front face 48 of said shoulder being engaged with the rear surface of the abutment 47 at the time the discharging device 2 reaches the limit of its backward movement, and, consequently, said shoulder and abutment coöperate to hold the device 2 in its discharging position and to prevent forward movement thereof. This locking means is particularly efficient in that the operation thereof is automatic and wholly dependent upon movement of the discharging device, and also in that said means is in close proximity to the device 2, and is therefore unaffected by the flexibility of parts, as the links 39, connected to actuating means at the front end of the distributer.

I preferably connect the locking means for the device 2, and particularly the pivot 42 and the abutment or stationary projection 47 to the supporting bracket 12, by a tie-piece 49 having one end removably secured by suitable fastening means to a side of the receptacle 1, and its other end provided with a laterally-projecting lug 50 formed with an open-ended slot adapted to receive a portion of one of the bolts 18, the lug 50 being clamped in position between the head of said bolt and one of the bosses 17. The tie-piece 49 adds greatly to the rigidity of the parts subjected to strain in locking the discharging device 2 in its rearward position during the discharge of the fertilizer, and, consequently, augments the efficiency of the locking means for said device 2. When the discharging device 2 is in its forward position, the cranks 38 serve to lock the same from backward movement.

My fertilizer-distributer is preferably provided with a comb comprising a rocking bar 51 disposed crosswise of the receptacle and provided with depending teeth 52 arranged in the path of the fertilizer when being discharged. The bar 51 is supported by uprights 53 and a cross-bar 54 connecting the upper ends of the uprights and formed integral therewith, said rocking bar 51 being usually journaled on the cross-bar 54. Springs 55 are arranged between the ends of the rocking bar 51 and the uprights 53, being here shown as coiled upon the ends of the cross-bar 54, and normally hold shoulders 56 on the ends of the rocking bar 51 in engagement with the rear faces of the uprights 53, and permit the bar 51 to yield in the direction of movement of the fertilizer being discharged. Said uprights 53 are mounted upon lengthwise bars 57 at opposite sides of the rear of the receptacle 1 and are united to said bars 57 by brackets 58 which are mounted on the bars 57. Brackets 59 are arranged at the rear ends of the sides of the receptacle 1 in advance of the brackets 12, 13, said brackets 59 having ears 60 engaging the outer surfaces of said sides.

The comb just described forms no part of this invention, but is the subject-matter of my application divisional of this application filed Oct. 15, 1904, Sr. No. 228,499.

The means for supporting the discharging device and coacting mechanism consists of the brackets 12, 13, 58 and the tie-piece 49, previously described, but although these parts are particularly suitable for use with the remaining features of my invention, it will be understood that any other desirable supporting means may be utilized.

The construction and operation of my fertilizer-distributer will now be readily understood upon reference to the foregoing description and the accompanying drawings, and it will be apparent to those skilled in the art that more or less change may be made in the component parts thereof, without departing from the spirit of my invention.

Having thus fully described my invention, what I claim as new and desire to secure by Letters Patent, is:—

1. In a fertilizer-distributer, a receptacle for the fertilizer, a discharging device movable for discharging the fertilizer, and having an additional movement into and out of its position assumed when discharging the fertilizer, mechanism for actuating said device to discharge the fertilizer, comprising driving and driven members, the driven member being movable with the discharging device into and out of engagement with said driving member and manually operated means for effecting the additional movement of the discharging device, substantially as and for the purpose described.

2. In a fertilizer-distributer, a receptacle for the fertilizer, a discharging device movable for discharging the fertilizer, and having an additional movement into and out of its position assumed when discharging the fertilizer, mechanism for actuating said device to discharge the fertilizer, comprising a driving member, and a driven member carried by the discharging device and movable therewith into and out of engagement with said driving member and manually operated means for effecting the additional movement of the discharging device, substantially as and for the purpose specified.

3. In a fertilizer-distributer, a receptacle for the fertilizer, a discharging device movable on an axis for discharging the fertilizer, and having an additional movement into and out of its position assumed when discharging the fertilizer, mechanism for actuating said device to discharge the fertilizer, comprising a driving member, and a driven member having its axis arranged coincident with the axis of the discharging device, said driven member being separable from the driving member and movable with the discharging device into and out of engagement with said driving member and manually-operated means for effecting the additional movement of the discharging device, substantially as and for the purpose described.

4. In a fertilizer-distributer, a receptacle for the fertilizer, a discharging device movable for discharging the fertilizer, and having an additional movement into and out of its position assumed when discharging the fertilizer, mechanism for actuating said device to discharge the fertilizer, comprising driving and driven members movable on axes arranged one in advance of the other, the driven member being movable with the discharging device into and out of engagement with said driving member and manually operated means for effecting the additional movement of the discharging device, substantially as and for the purpose set forth.

5. In a fertilizer-distributer, a receptacle for the fertilizer, a discharging device movable on an axis for discharging the fertilizer, and movable rearwardly and forwardly into and out of its position assumed when discharging the fertilizer, and mechanism for actuating said device to discharge the fertilizer, comprising a driving member arranged with its axis at the rear of the axis of the discharging device, and a driven member having its axis arranged coincident with the axis of the discharging device, said driven member being movable rearwardly and forwardly with the discharging device into and out of engagement with the driving member, substantially as and for the purpose described.

6. In a fertilizer-distributer, a receptacle for the fertilizer, a discharging device movable for discharging the fertilizer, and having an additional movement rectilinearly into and out of its position assumed when discharging the fertilizer, mechanism for actuating said device to discharge the fertilizer, comprising driving and driven members, the driven member being movable with the discharging device into and out of engagement with said driving member, and being at rest when not engaged with the driving member, and means for constantly rotating the driving member, substantially as and for the purpose specified.

7. In a fertilizer-distributer, a receptacle for the fertilizer, a discharging device movable on an axis for discharging the fertilizer, and movable rearwardly and forwardly into and out of its position assumed when discharging the fertilizer, said discharging device being at rest when in its forward position and serving as an end board for the receptacles mechanism for actuating said device to discharge the fertilizer, comprising driving and driven members, the driven member being movable rearwardly and forwardly with the discharging device into and out of engagement with said driving member, and being at rest when the discharging device is at rest, and means for constantly rotating the driving member, substantially as and for the purpose set forth.

8. In a fertilizer-distributer, a receptacle for the fertilizer, a discharging device movable for discharging the fertilizer, and having an additional movement into and out of its position assumed when discharging the fertilizer, mechanism for actuating said device to discharge the fertilizer, a fixed abutment, and means for moving the discharging device into and out of its position assumed when discharging the fertilizer, said means coöperating with the fixed abutment when said device is in its discharging position and thereby holding the device in said position, substantially as and for the purpose described.

9. In a fertilizer-distributer, a receptacle for the fertilizer, a discharging device movable for discharging the fertilizer, and having an additional movement into and out of its position assumed when discharging the fertilizer, mechanism for actuating said device to discharge the fertilizer, a fixed abutment, an operating member, and means for transmitting motion from the operating member to the discharging device to move said device into and out of its position assumed when discharging the fertilizer, said means coöperating with the fixed abutment when said device is in its discharging position and thereby holding the device in said position, substantially as and for the purpose specified.

10. In a fertilizer-distributer, a receptacle for the fertilizer, a discharging device movable for discharging the fertilizer, and having an additional movement into and out of its position assumed when discharging the fertilizer, mechanism for actuating said device to discharge the fertilizer, locking means for holding the discharging device in its position assumed when discharging the fertilizer, and an operating member for moving the discharging device into and out of its position assumed when discharging the fertilizer and for simultaneously moving the locking means into and out of operative position, substantially as and for the purpose set forth.

11. In a fertilizer-distributer, a receptacle for the fertilizer, a discharging device movable for discharging the fertilizer, and having an additional movement into and out of its position assumed when discharging the fertilizer, mechanism for actuating said device to discharge the fertilizer, and locking means for holding the discharging device in its position assumed when discharging the fertilizer, said means comprising a pivoted lever, and a link movable on a pivot connected to the discharging device, and pivoted to the lever eccentric to the pivot of said lever, the axis of the pivot connecting said lever and link, being movable in an arc beyond a line passing through the pivot of the lever, and the pivot for the link connected to the discharging device, substantially as and for the purpose described.

12. In a fertilizer-distributer, a receptacle for the fertilizer, a discharging device movable for discharging the fertilizer, and having an additional movement into and out of its position assumed when discharging the fertilizer, mechanism for actuating said device to discharge the fertilizer, and locking means comprising a fixed abutment and means for holding the discharging device in its position assumed when discharging the fertilizer, said last-named means having a part movable into engagement with the abutment, substantially as and for the purpose specified.

13. In a fertilizer-distributer, a receptacle for the fertilizer, a discharging device movable for discharging the fertilizer, and having an additional movement into and out of its position assumed when discharging the fertilizer, mechanism for actuating said device to discharge the fertilizer, a movable support for the discharging device, and locking means comprising an abutment in advance of the movable support, and means for holding the discharging device in its position assumed when discharging the fertilizer, said last-named means being provided with a part movable between the support for the discharging device and the abutment, and into engagement with said abutment, substantially as and for the purpose set forth.

14. In a fertilizer-distributer, a receptacle for the fertilizer, a discharging device movable for discharging the fertilizer, and having an additional movement into and out of its position assumed when discharging the fertilizer, mechanism for actuating said device to discharge the fertilizer, a movable support for the discharging device, and locking means comprising a fixed abutment, a pivoted lever, and a link adjustable in length and pivoted to the movable support and also pivoted to the lever eccentric to the pivot of said lever, the axis of the pivot connecting said lever and link, being movable in an arc beyond a line passing through the pivot of the lever, and the pivot connecting the link to the support, said lever having a shoulder movable between the pivot for the lever and the curved path of movement of the pivot connecting said lever and link, into engagement with the fixed abutment, substantially as and for the purpose described.

15. In a fertilizer-distributer, a receptacle for the fertilizer, a discharging device movable for discharging the fertilizer, and having an additional movement into and out of its position assumed when discharging the fertilizer, mechanism for actuating said device to discharge the fertilizer, a supporting bracket for the discharging device, locking means for holding the discharging device in its position assumed when discharging the fertilizer, and a support for said locking means connected to the bracket, substantially as and for the purpose specified.

16. In a fertilizer-distributer, a receptacle for the fertilizer, a discharging device movable for discharging the fertilizer, and having an additional movement into and out of its position assumed when discharging the fertilizer, mechanism for actuating said device to discharge the fertilizer, a supporting bracket for the discharging device, locking means for holding the discharging device in its position assumed when discharging the fertilizer, said means comprising a fixed abutment and a rocking lever movable into and out of engagement with the abutment, and a support having one end fixed to the abutment and to the pivot for the rocking lever, and its other end detachably engaged with the bracket, substantially as and for the purpose set forth.

17. In a fertilizer-distributer, a receptacle for the fertilizer, a discharging device movable for discharging the fertilizer, and having an additional movement into and out of its position assumed when discharging the fertilizer, and mechanism for actuating said device to discharge the fertilizer, comprising a driving member provided with sprocket-teeth, a driven member carried by the discharging device and movable therewith into and out of engagement with said driving member, a sprocket-wheel, and a chain engaging the sprocket-teeth of the driving member and the sprocket-wheel, substantially as and for the purpose described.

18. In a fertilizer-distributer, the combination of a receptacle for the fertilizer, and a discharging device movable for discharging the fertilizer, and having an additional movement into and out of its position assumed when discharging the fertilizer; with mechanism for actuating said device to discharge the fertilizer, comprising a driving member provided with a hub of angular cross-section, a sprocket-wheel detachably mounted on the hub, a second sprocket-wheel, a chain connecting said sprocket-wheels, and a driven member fixed to the discharging device and movable therewith into and out of engagement with said driving member, substantially as and for the purpose specified.

19. In a fertilizer-distributer, the combination of a receptacle for the fertilizer, and a discharging device for the fertilizer; with a supporting bracket for the discharging device provided with a spindle, a driving axle, and mechanism for actuating the discharging device comprising a driving member supported by the spindle, a driven member associated with the discharging device and coöperating with the driving member, sprocket-wheels on the driving member and driving axle, and a chain coöperating with the sprocket-wheels, and a brace between the driving axle and the outer end of the spindle, substantially as and for the purpose specified.

In testimony whereof, I have hereunto signed my name in the presence of two attesting witnesses, at Syracuse, in the county of Onondaga, in the State of New York, this 15th day of March, 1904.

ROBERT LOVE.

Witnesses:
D. LAVINE,
S. DAVIS.